US011859588B2

(12) United States Patent
Hamane et al.

(10) Patent No.: US 11,859,588 B2
(45) Date of Patent: Jan. 2, 2024

(54) METHOD FOR CONTROLLING INTERNAL COMBUSTION ENGINE, AND DEVICE FOR CONTROLLING INTERNAL COMBUSTION ENGINE

(71) Applicant: Nissan Motor Co., Ltd., Yokohama (JP)

(72) Inventors: Shouta Hamane, Kanagawa (JP); Tadashi Iwamoto, Kanagawa (JP)

(73) Assignee: Nissan Motor Co., Ltd., Yokohama (JP)

( * ) Notice: Subject to any disclaimer, the term of this patent is extended or adjusted under 35 U.S.C. 154(b) by 0 days.

(21) Appl. No.: 18/040,452

(22) PCT Filed: Sep. 24, 2020

(86) PCT No.: PCT/JP2020/035993
§ 371 (c)(1),
(2) Date: Feb. 3, 2023

(87) PCT Pub. No.: WO2022/064591
PCT Pub. Date: Mar. 31, 2022

(65) Prior Publication Data
US 2023/0304464 A1 Sep. 28, 2023

(51) Int. Cl.
*F02N 11/08* (2006.01)
*F02D 29/02* (2006.01)
*F02D 41/04* (2006.01)

(52) U.S. Cl.
CPC .......... *F02N 11/0844* (2013.01); *F02D 29/02* (2013.01); *F02D 41/042* (2013.01); *F02N 11/0822* (2013.01)

(58) Field of Classification Search
CPC .... F02N 11/0844; F02D 29/02; F02D 41/042; F02D 13/08; F02D 13/0219;
(Continued)

(56) References Cited

U.S. PATENT DOCUMENTS 6,013,992 A * 1/2000 Ishikawa ................. B60L 50/15
903/917
6,124,690 A * 9/2000 Yano ..................... B60W 10/18
903/917

(Continued)

FOREIGN PATENT DOCUMENTS

EP    2 410 158 A1   1/2012
EP    2 460 707 A1   6/2012
(Continued)

OTHER PUBLICATIONS

Extended European Search Report dated Oct. 18, 2023 of corresponding European Patent Application No. 20955185.2.

*Primary Examiner* — John Kwon
(74) *Attorney, Agent, or Firm* — Global IP Counselors, LLP

(57) ABSTRACT

In an internal combustion engine, fuel injection is stopped to automatically stop the engine when automatic stop conditions are met. When there is a request to restart the engine while an engine speed is decreasing due to automatic stoppage, the engine is started by resuming fuel injection if the engine speed is equal to or greater than a combustion recoverable rotational speed threshold, at which restarting is possible only by fuel injection. When there is a request to restart the engine while an engine speed is decreasing due to automatic stoppage, the engine is started using a starter motor if the engine speed is less than the combustion recoverable rotational speed threshold. When there is a request to restart the engine in a brake ON state, the engine is not started by resuming fuel injection, but rotated and started using the starter motor.

9 Claims, 6 Drawing Sheets

(58) Field of Classification Search
CPC ........... F02D 13/0211; F02D 2200/101; F02D 2200/022; F02D 2041/001; F02D 2041/0092; F02D 2013/0292; F02B 2075/125

See application file for complete search history.

(56) References Cited

U.S. PATENT DOCUMENTS

| | | | | |
|---|---|---|---|---|
| 2005/0090365 | A1* | 4/2005 | Tamai | B60K 6/543 |
| | | | | 477/37 |
| 2013/0179055 | A1* | 7/2013 | Kato | B60W 30/19 |
| | | | | 701/113 |
| 2015/0369199 | A1* | 12/2015 | Nakamura | F02D 13/0211 |
| | | | | 123/179.4 |
| 2021/0047992 | A1* | 2/2021 | Hamane | F02N 11/04 |

FOREIGN PATENT DOCUMENTS

| | | |
|---|---|---|
| JP | 2008-215154 A | 9/2008 |
| JP | 2010-223006 A | 10/2010 |
| JP | 2016-3649 A | 1/2016 |
| WO | 2019/069345 A1 | 4/2019 |

* cited by examiner

METHOD FOR CONTROLLING INTERNAL COMBUSTION ENGINE, AND DEVICE FOR CONTROLLING INTERNAL COMBUSTION ENGINE

CROSS-REFERENCE TO RELATED APPLICATIONS

This application is a U.S. national stage application of International Application No. PCT/JP2020/035993, filed on Sep. 24, 2020.

BACKGROUND

Technical Field

The present invention relates to a method and device for controlling an internal combustion engine.

Background Information

Idle stop control for internal combustion engines is known in the prior art. In idle stop control, the internal combustion engine is automatically stopped when predetermined automatic stop conditions are met during idling, and the internal combustion engine is automatically restarted when a predetermined automatic restart condition is met during the automatic stop.

For example, in Japanese Patent Application Publication No. 2010-223006 (Patent Document 1), fuel injection is stopped when an automatic stop request is generated while an internal combustion engine is running. In Patent Document 1, when a request to restart the internal combustion engine is generated during a fuel injection stoppage due to an automatic stop request, the internal combustion engine is restarted only by fuel injection if an engine speed at the time is within a rotational speed region at which restarting only by fuel injection is possible (equal to or greater than a rotational speed lower limit at which starterless starting is possible), and the internal combustion engine is restarted using a starter that rotatably drives a crankshaft if the engine speed at the time is outside of the rotational speed region at which restarting only by fuel injection is possible (less than the rotational speed lower limit at which starterless starting is possible).

The lower limit of the engine speed at which restarting only by fuel injection is possible (the rotational speed lower limit at which starterless starting is possible) is set according to a deceleration rate of the internal combustion engine. However, when a driver depresses a brake pedal, the deceleration rate of the internal combustion engine changes depending on the extent to which the brake is depressed (depressed amount), and it will be difficult to establish the lower limit of the engine speed at which combustion can start. If the lower limit of the engine speed at which combustion can start is set assuming that the deceleration rate of the internal combustion engine is high due to sudden braking, the region in which combustion start is possible will be restricted when the deceleration rate of the internal combustion engine is normal (braking is not sudden).

SUMMARY

In an internal combustion engine of the present invention, when a request to restart the internal combustion engine has been made while an engine speed is decreasing due to automatic stoppage of the internal combustion engine, the internal combustion engine is started by resuming fuel injection if the engine speed is equal to or greater than a predetermined rotational speed threshold at which restarting is possible only by fuel injection, and the internal combustion engine is caused to rotate and started using an electric motor if the engine speed of the internal combustion engine is lower than the rotational speed threshold. When a restart request has been made in a brake ON state during a decrease in the engine speed of the internal combustion engine due to automatic stoppage, the internal combustion engine is caused to rotate using the electric motor and started.

As a result, the rotational speed threshold of the engine speed at which restarting is possible only by fuel injection must be set while taking into account any increase in the deceleration rate of the internal combustion engine accompanying braking by the driver. That is, when a restart request has been made while the brake is not being depressed, the region in which the engine is restarted only by fuel injection can be expanded.

BRIEF DESCRIPTION OF THE DRAWINGS

Referring now to the attached drawings which form a part of this original disclosure.

DETAILED DESCRIPTION

Figure 1:
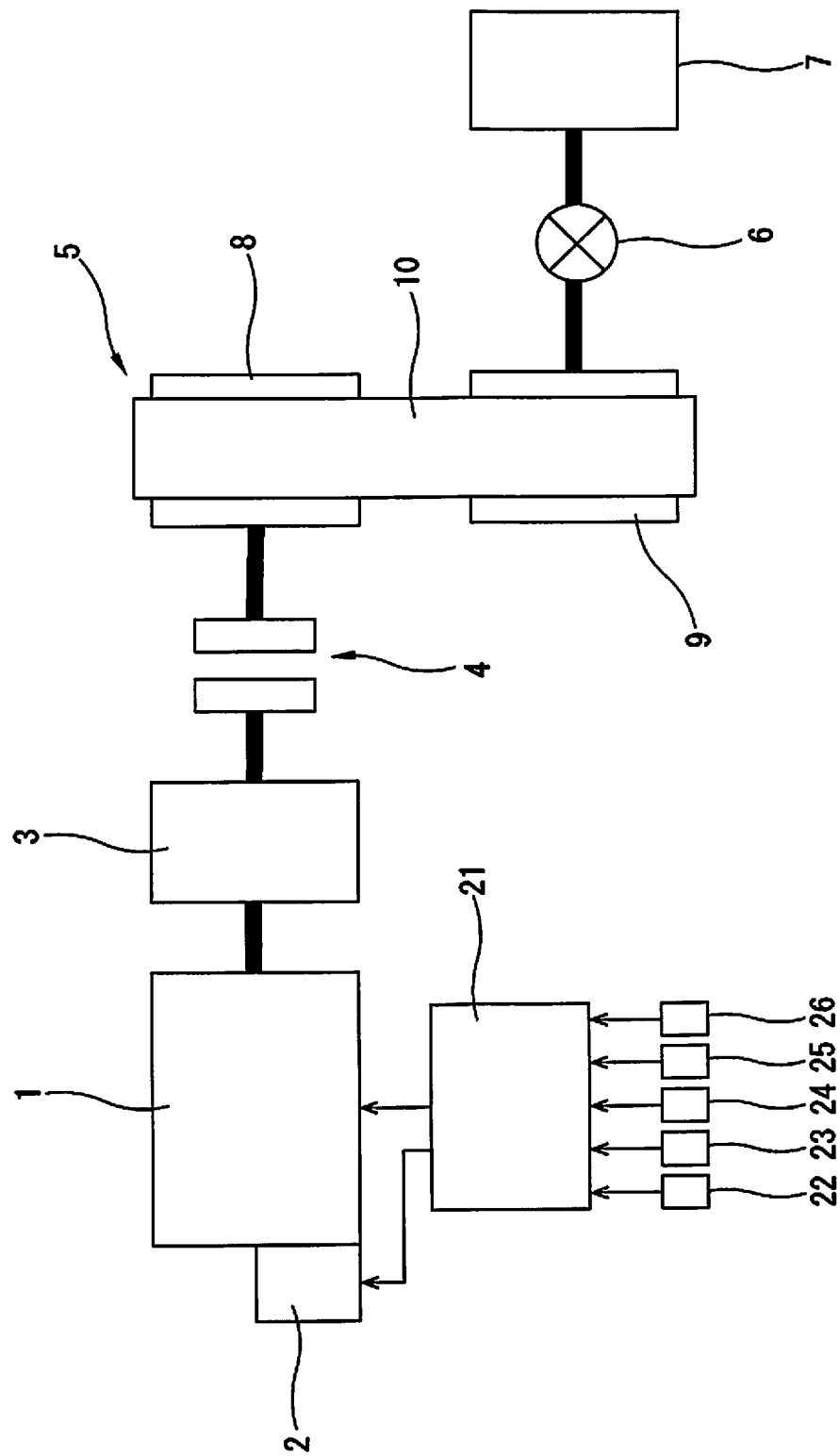
FIG. 1 is an explanatory diagram schematically depicting an outline of a system configuration of an internal combustion engine to which the present invention is applied.

An embodiment of the present invention is described below on the basis of the drawings. FIG. 1 is an explanatory diagram schematically depicting an outline of a system configuration of an internal combustion engine 1 to which the present invention is applied.

The internal combustion engine 1 is, for example, a multi-cylinder spark ignition gasoline engine, and is mounted as a drive source in an automobile or another vehicle. The internal combustion engine 1 may be a diesel engine.

The internal combustion engine 1 has a fuel injection valve (not shown). An amount of fuel injected through the fuel injection valve, a fuel injection timing of the fuel injection valve, a pressure of fuel supplied to the fuel injection valve, and the like are optimally controlled by a control unit 21, which will be described later.

The internal combustion engine 1 has a starter motor 2 serving as an electric motor. The starter motor 2 rotates a crankshaft (not shown) of the stopped internal combustion engine 1 to start (cranking) the internal combustion engine 1. The starter motor 2 is controlled by a control unit 21, described hereinafter.

Drive force of the internal combustion engine 1 is transmitted via a torque converter 3 and a clutch 4 to a continuously variable transmission (CVT) 5 serving as a transmission, and the drive force transmitted to the CVT 5 is transmitted via a final gear 6 to drive wheels 7 of the vehicle.

That is, the internal combustion engine 1 transmits, for example, rotation of the crankshaft (not shown) as drive force to the drive wheels 7 of the vehicle.

The clutch 4 is positioned between the torque converter 3 and the CVT 5, and is engaged when driving torque from the internal combustion engine 1 can be transmitted to the drive wheels 7. That is, the clutch 4 is disposed on a motive power transmission path through which the drive force of the internal combustion engine 1 is transmitted to the drive wheels 7. The operation of engaging/disengaging the clutch 4 is performed on the basis of a control command from the control unit 21 (described hereinafter). The clutch 4 is disengaged during, for example, a coasting stop (described hereinafter) or the like.

The CVT 5 has a primary pulley 8 on an input side, a secondary pulley 9 on an output side, and a belt 10 that transmits rotation of the primary pulley 8 to the secondary pulley 9.

The CVT 5, for example, uses oil pressure to change widths of V grooves (not shown) in the primary pulley 8 and the secondary pulley 9 around which the belt 10 is wound, changes a contact radius between the belt 10 and the primary pulley 8 and secondary pulley 9, and continuously changes a transmission ratio.

The CVT 5 is used as the transmission, but it is also possible to use a stepped automatic transmission instead of the CVT 5. In this case, the clutch 4 would be configured using a plurality of friction engagement elements in the stepped automatic transmission.

The control unit 21 receives detection signals from a crank angle sensor 22 that detects a crank angle of the crankshaft 2, an accelerator position sensor 23 that detects an amount by which an accelerator pedal (not shown) is depressed, a vehicle speed sensor 24 that detects speed of the vehicle, a brake sensor 25 that detects an amount by which a brake pedal (not shown) is depressed, a catalyst temperature sensor 26 that detects a catalyst temperature of an exhaust purification catalyst (not shown) provided in an exhaust passage (not shown) of the internal combustion engine 1, a pressure sensor 27 that detects a pressure (air pressure) in the collector 4, and other various sensors.

The control unit 21 calculates load (engine load) required by the internal combustion engine 1 using the detection value of the accelerator position sensor 23.

The control unit 21 is capable of detecting a state of charge (SOC), which is a ratio of a remaining charge to a charge capacity of an onboard battery (not shown). In other words, the control unit 21 is equivalent to a battery SOC detection part.

The crank angle sensor 22 is capable of detecting an engine speed (number of engine rotations) of the internal combustion engine 1.

When predetermined automatic stop conditions are met while the vehicle is traveling or stopped, the fuel supply is stopped and the internal combustion engine 1 stops automatically. The internal combustion engine 1 then restarts when a predetermined automatic restart condition is met during the automatic stop. In other words, the control unit 21 automatically stops the internal combustion engine 1 when the predetermined automatic stop conditions are met, and automatically restarts the internal combustion engine 1 when a predetermined automatic restart condition is met.

The automatic stop conditions of the internal combustion engine 1 are, for example, that the accelerator pedal is not depressed, that the battery SOC of the onboard battery is greater than a predetermined battery threshold SOCth, that the catalyst temperature of the exhaust purification catalyst is higher than a predetermined first catalyst temperature threshold T1, and the like.

The internal combustion engine 1 automatically stops when these automatic stop conditions have all been met. In other words, the control unit 21 automatically stops the internal combustion engine 1 when these automatic stop conditions have all been met while the internal combustion engine 1 is running. That is, the control unit 21 is equivalent to a first control part that stops fuel injection to automatically stop the internal combustion engine 1 when predetermined automatic stop conditions are met.

Conditions for automatically restarting the internal combustion engine 1 are, for example, that the accelerator pedal is depressed, that the battery SOC of the onboard battery is equal to or less than the predetermined battery threshold SOCth, that the catalyst temperature of the exhaust purification catalyst is equal to or less than the predetermined first catalyst temperature threshold T1, and the like.

The internal combustion engine 1 restarts when a restart request has been made during an automatic stop. In other words, the control unit 21 restarts the internal combustion engine 1 when any of these automatic restart conditions is met during an automatic stop of the internal combustion engine 1. For example, the automatically stopped internal combustion engine 1 restarts when the battery SOC of the onboard battery becomes equal to or less than battery threshold SOCth, which is a predetermined value.

Examples of an automatic stop of the internal combustion engine 1 include an idle stop, a "coast stop," and a "sailing stop."

An idle stop is carried out when automatic stop conditions such as, for example, those described above are met while the vehicle has temporarily stopped. The idle stop is canceled when any automatic restart condition such as, for example, those described above is met.

A coast stop is carried out when automatic stop conditions such as, for example, those described above are met while the vehicle is traveling. The coast stop is canceled when any automatic restart condition such as, for example, those described above is met. A coast stop is an automatic stopping of the internal combustion engine 1 during deceleration with the brake pedal depressed at, for example, a low vehicle speed.

A sailing stop is carried out when automatic stop conditions such as, for example, those described above are met while the vehicle is traveling. The sailing stop is canceled when any automatic restart condition such as, for example, those described above is met. A sailing stop is an automatic stopping of the internal combustion engine 1 during inertia traveling with the brake pedal not depressed at, for example, a medium to high vehicle speed.

When a request to restart the internal combustion engine 1 has been made during a decrease in the engine speed of the internal combustion engine 1 due to an automatic stop, the control unit 21 starts (causes combustion to occur in) the internal combustion engine 1 by resuming fuel injection if the engine speed of the internal combustion engine 1 is equal to or greater than a predetermined combustion recoverable rotational speed threshold R1 (rotational speed threshold) at which restarting is possible only by fuel injection, and rotatably drives the crankshaft 2 using the alternator 6 to start (crank) the internal combustion engine 1 if the engine speed of the internal combustion engine 1 is lower than the combustion recoverable rotational speed threshold R1. Furthermore, when a restart request has been made in a brake ON state in which the brake pedal is depressed, the control unit 21 does not start the internal combustion engine 1 by resuming fuel injection, but rather causes the internal combustion engine 1 to rotate and using the starter motor 2, thus starting the engine, after the engine speed has reached "0." That is, the control unit 21 is equivalent to a second control part.

The combustion recoverable rotational speed threshold R1 is set by taking into account a time difference between a timing at which a fuel injection start command for the internal combustion engine 1 during an automatic stop is issued and a timing at which fuel is ignited in the cylinders (a timing of first combustion after fuel injection is resumed). That is, the combustion recoverable rotational speed threshold R1 is set so that the engine speed at the timing of the first combustion after fuel injection is resumed does not fall below the rotational speed at which the internal combustion engine 1 can be started by resuming fuel injection, taking into account the extent of decrease in the engine speed from the timing at which the fuel injection start command is issued until the timing at which fuel is ignited in the cylinders. The combustion recoverable rotational speed threshold R1 is set according to the deceleration rate of the internal combustion engine 1, and is, e.g., about 600 rpm.

When the automatically stopped internal combustion engine 1 is started (combustion is started) by a resuming of fuel injection, there is a time difference between the timing at which the fuel injection start command is issued and the timing at which fuel is ignited in the cylinders. That is, the timing of a combustion start in the internal combustion engine 1 is delayed from the timing at which the fuel injection start command is issued, which is because the fuel is supplied to a cylinder in an intake stroke after the fuel injection start command is issued, and the fuel in this cylinder is ignited (combusted) through a compression stroke.

When the automatically stopped internal combustion engine 1 is started (combustion is started) by a resuming of fuel injection and the deceleration rate of the vehicle increases due to further depression of the brake pedal at the timing at which the fuel injection start command is issued, there is a possibility that the engine speed will decrease significantly before the timing of ignition in the cylinder in which the fuel combusts first. When the deceleration rate of the vehicle increases due to the brake pedal being depressed further, the engine speed of the internal combustion engine 1 is impeded by the deceleration rate of the vehicle, and the engine speed falls at a faster rate.

Therefore, in the internal combustion engine 1, the engine speed decreases significantly before the timing of ignition in the cylinder in which the fuel combusts first, and there is a risk that the engine will stall without the fuel being able to combust and the internal combustion engine 1 cannot be started by a resuming of fuel injection.

Therefore, the internal combustion engine 1 is started using the starter motor 2 instead of starting by resuming fuel injection when a restart request has been made during a brake ON state in which the brake pedal is depressed.

The restart request during brake ON in which the brake pedal is depressed is not caused by an acceleration request from the driver. Therefore, there is little need to restart the internal combustion engine 1 early in response to a restart request during brake ON. Therefore, when a restart request has been made while the brake pedal is depressed, the internal combustion engine 1 is started using the starter motor 2 after the engine speed reaches "0," rather than the internal combustion engine 1 being started by a resuming of fuel injection.

Therefore, the lower limit (combustion recoverable rotational speed threshold R1) of the engine speed at which the engine can be started only by fuel injection does not need to be set by taking into account the increase in the deceleration rate of the internal combustion engine 1 that accompanies braking by the driver.

That is, when a restart request has been made while the brake pedal is not being depressed, the region in which the engine is restarted only by fuel injection can be expanded.

Figure 2:
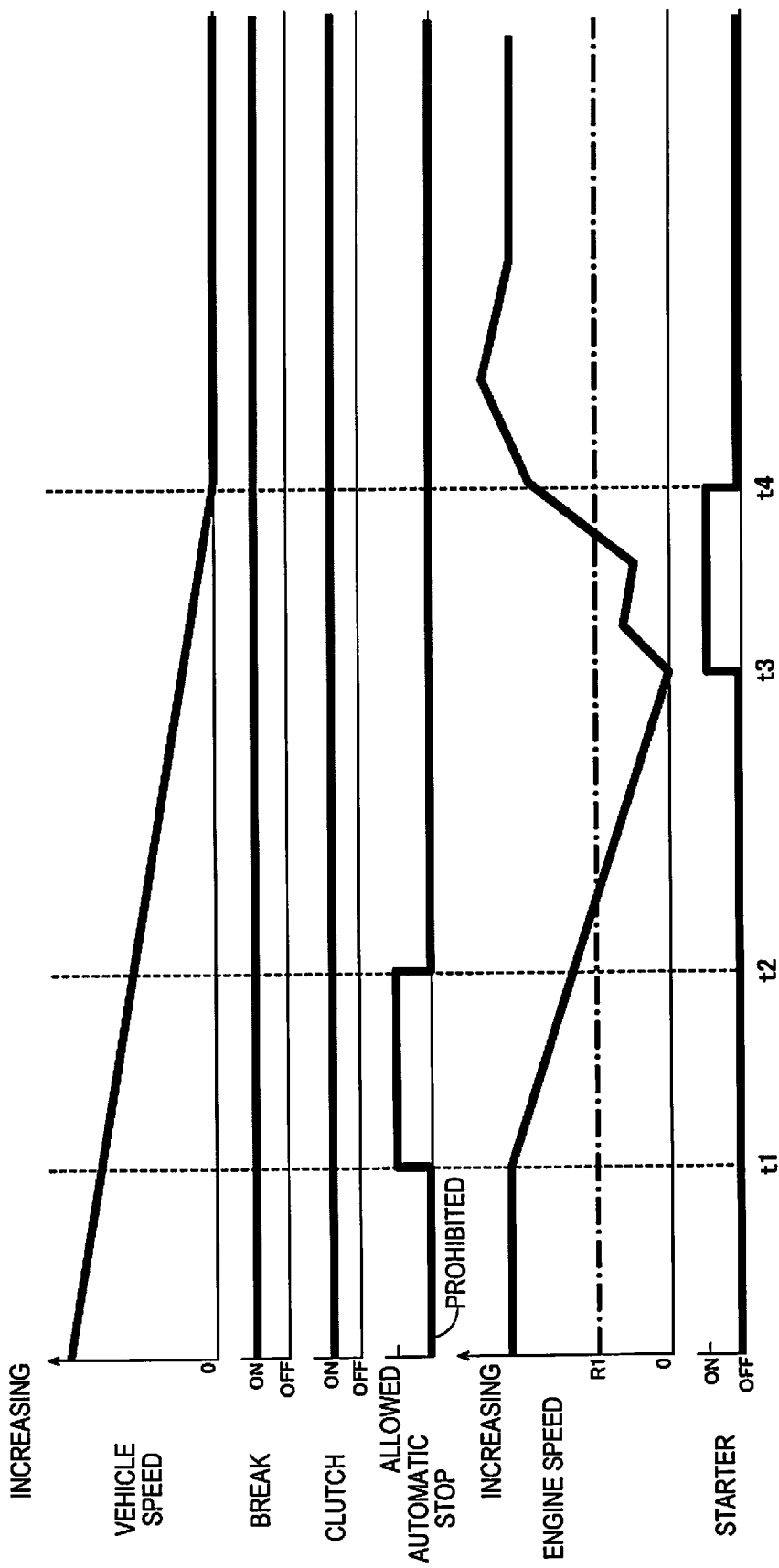
FIG. 2 is a timing chart of an example showing how the automatically stopped internal combustion engine is restarted.

FIG. 2 is a timing chart showing how the automatically stopped internal combustion engine 1 is restarted, and shows a case in which the internal combustion engine 1 in a brake ON state is restarted.

Time t1 in FIG. 2 is a timing at which the automatic stop conditions of the internal combustion engine 1 are met. In FIG. 2, the automatic stop conditions are met at time t1, at which the brake is ON and the vehicle speed is decreasing, and automatic stoppage of the internal combustion engine 1 is allowed.

Time t2 in FIG. 2 is a timing at which there is a request to restart the automatically stopped internal combustion engine 1. That is, time t2 in FIG. 2 is a timing at which any automatic restart condition such as those described above is met.

In time t2 in FIG. 2, the engine speed is greater than the combustion recoverable rotational speed threshold R1, but the brake ON state is in effect. Therefore, the internal combustion engine 1 is not restarted by a starting of combustion, but is rather restarted by the starter motor 2 after the engine speed reaches "0."

Time t3 in FIG. 2 is a timing at which the engine speed reaches "0" after the restart request. The starter motor 2 starts (switches to ON) at time t3. Time t3-t4 of FIG. 2 is a cranking period during which the crankshaft of the internal combustion engine 1 is caused to rotate by the starter motor 2.

Figure 3:
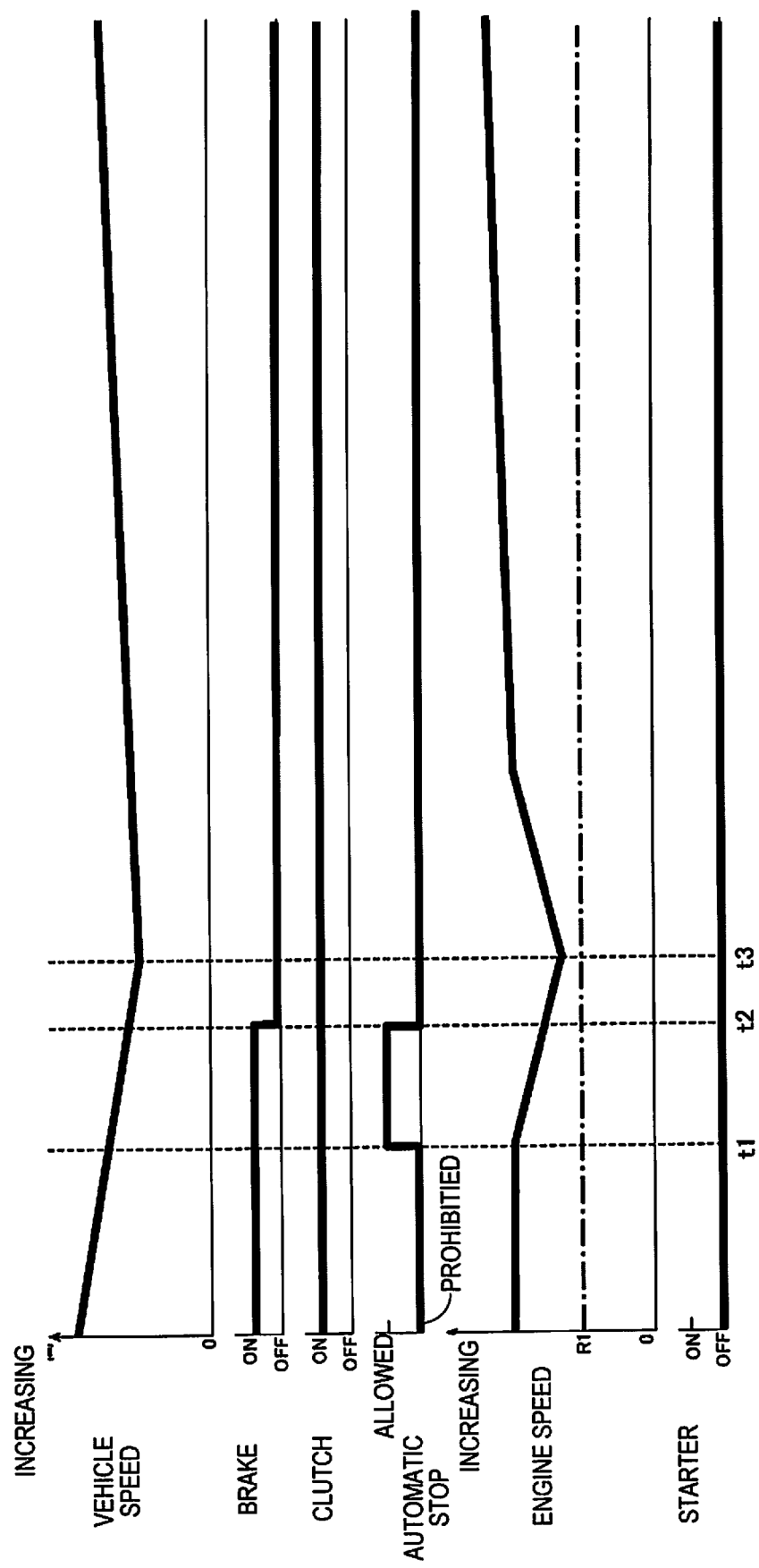
FIG. 3 is a timing chart of an example showing how the automatically stopped internal combustion engine is restarted.

FIG. 3 is a timing chart showing how the automatically stopped internal combustion engine 1 is restarted, and shows a case in which the brake becomes OFF and the vehicle reaccelerates when the automatically stopped internal combustion engine 1 is restarted.

Time t1 in FIG. 3 is a timing at which the automatic stop conditions of the internal combustion engine 1 are met. In FIG. 3, the automatic stop conditions are met at time t1, at which the brake switches to ON and the vehicle speed is decreasing, and automatic stoppage of the internal combustion engine 1 is allowed.

Time t2 in FIG. 3 is a timing at which the acceleration pedal is depressed and a restart request is issued to the automatically stopped internal combustion engine 1. That is, time t2 in FIG. 3 is a timing at which any automatic restart condition such as those described above is met due to the brake pedal being depressed. In addition, time t2 in FIG. 3 is a timing at which a foot of the driver leaves the brake pedal and a brake OFF state comes into effect.

At time t2 in FIG. 3, a brake OFF state comes into effect and the engine speed will be than the combustion recoverable rotational speed threshold R1. Therefore, at time t2 in FIG. 3, a restarting of the internal combustion engine 1 due to a start of combustion is initiated. Time t3 in FIG. 3 is a timing of the first combustion after fuel injection is resumed.

When a restart request has been made in a state in which the clutch 4 is disengaged and the drive force of the internal combustion engine 1 is not being transmitted to the drive wheels 7, if the engine speed of the internal combustion engine 1 is equal to or greater than the combustion recoverable rotational speed threshold R1 (rotational speed threshold), the control unit 21 starts the internal combustion engine 1 by resuming fuel injection even in a brake ON state in which the brake pedal is depressed.

When the clutch 4 is disengaged (clutch OFF), the internal combustion engine 1 will not be affected by any increase in the deceleration rate caused by braking by the driver. Therefore, when a restart request has been made, the control unit 21 starts the internal combustion engine 1 by resuming fuel injection if the engine speed of the internal combustion engine 1 is equal to or greater than the combustion recoverable rotational speed threshold R1 while the clutch 4 is disengaged, even in a brake ON state.

It is thereby possible to expand the region in which the internal combustion engine 1 is restarted only by fuel injection.

Figure 4:
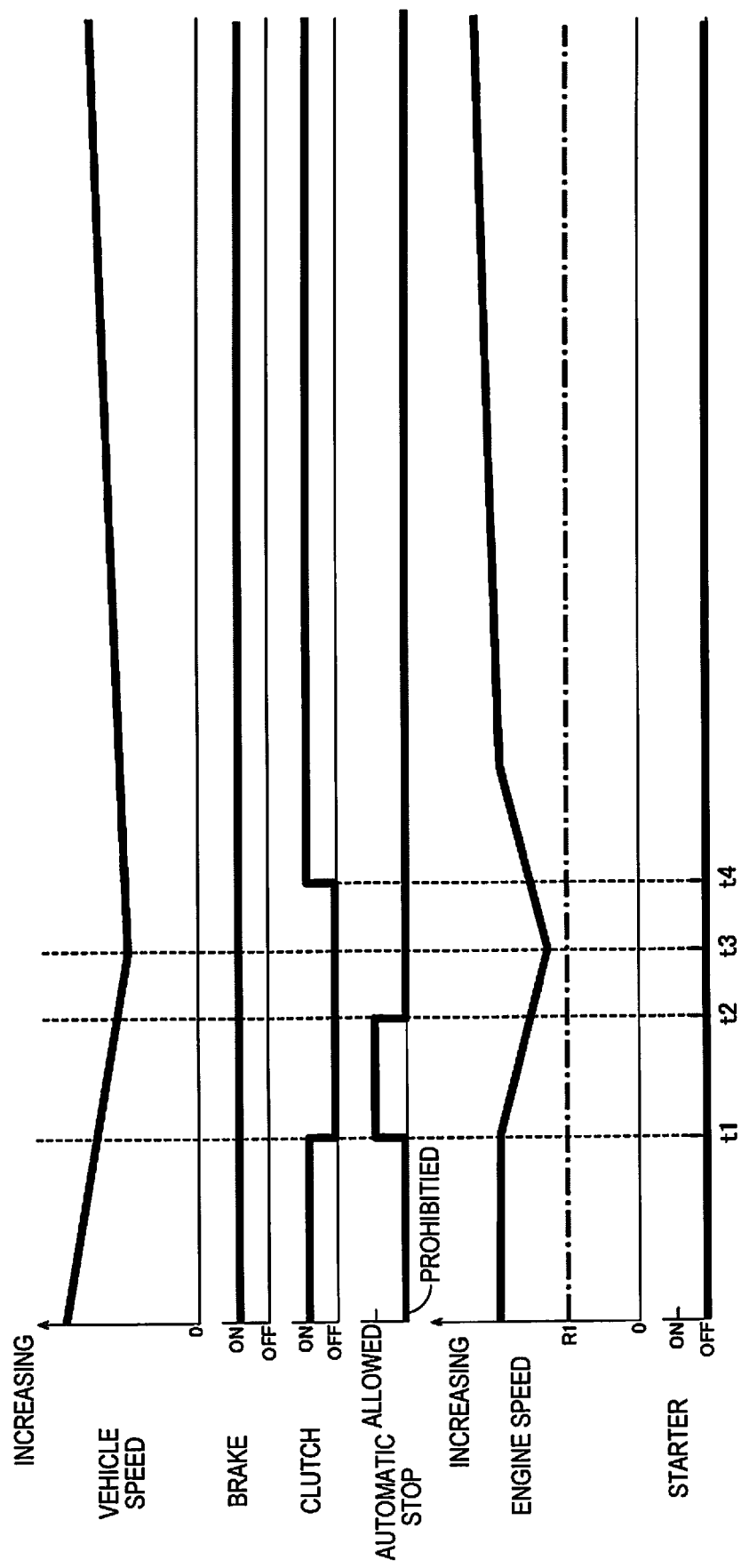
FIG. 4 is a timing chart of an example showing how the automatically stopped internal combustion engine is restarted.

FIG. 4 is a timing chart showing how the automatically stopped internal combustion engine 1 is restarted, and shows a case in which the clutch 4 is disengaged when the automatically stopped internal combustion engine 1 is restarted.

Time t1 in FIG. 4 is a timing at which the automatic stop conditions of the internal combustion engine 1 are met. In FIG. 4, the automatic stop conditions are met at time t1, at which the brake switches to ON and the vehicle speed is decreasing, and automatic stoppage (coast stop) of the internal combustion engine 1 is allowed. At the timing of time t1 in FIG. 4, the clutch 4 is disengaged along with the initiation of the coast stop.

Time t2 in FIG. 4 is a timing at which a restart request is issued to the automatically stopped internal combustion engine 1. That is, time t2 in FIG. 4 is a timing at which any automatic restart condition such as those described above is met.

At time t2 in FIG. 4, the brake ON state is in effect, but the clutch 4 is disengaged and the engine speed has exceeded the combustion recoverable rotational speed threshold R1. Therefore, at time t2 in FIG. 4, a restart of the internal combustion engine 1 via a combustion start is initiated.

Time t3 in FIG. 4 is a timing of the first combustion after fuel injection is resumed. Time t4 in FIG. 4 is a timing at which the clutch 4 is engaged after the start of combustion in the internal combustion engine 1.

When a restart request has been made while the internal combustion engine 1 is stopped or when a restart request has been made while the speed of the vehicle is equal to or less than a predetermined low vehicle speed threshold V1 at which little effect is caused by the deceleration rate of the internal combustion engine 1 regardless of the brake being ON, the control unit 21 starts the internal combustion engine 1 by resuming fuel injection even in a brake ON state.

The internal combustion engine 1 is not affected by an increase in the deceleration rate caused by braking by the driver while the vehicle is stopped or the vehicle speed is equal to or less than the predetermined low vehicle speed threshold V1. Therefore, in either of these cases, the control unit 21 starts the internal combustion engine 1 by resuming fuel injection even if the brake is depressed.

It is thereby possible to expand the region in which the internal combustion engine 1 is restarted only by fuel injection.

Figure 5:
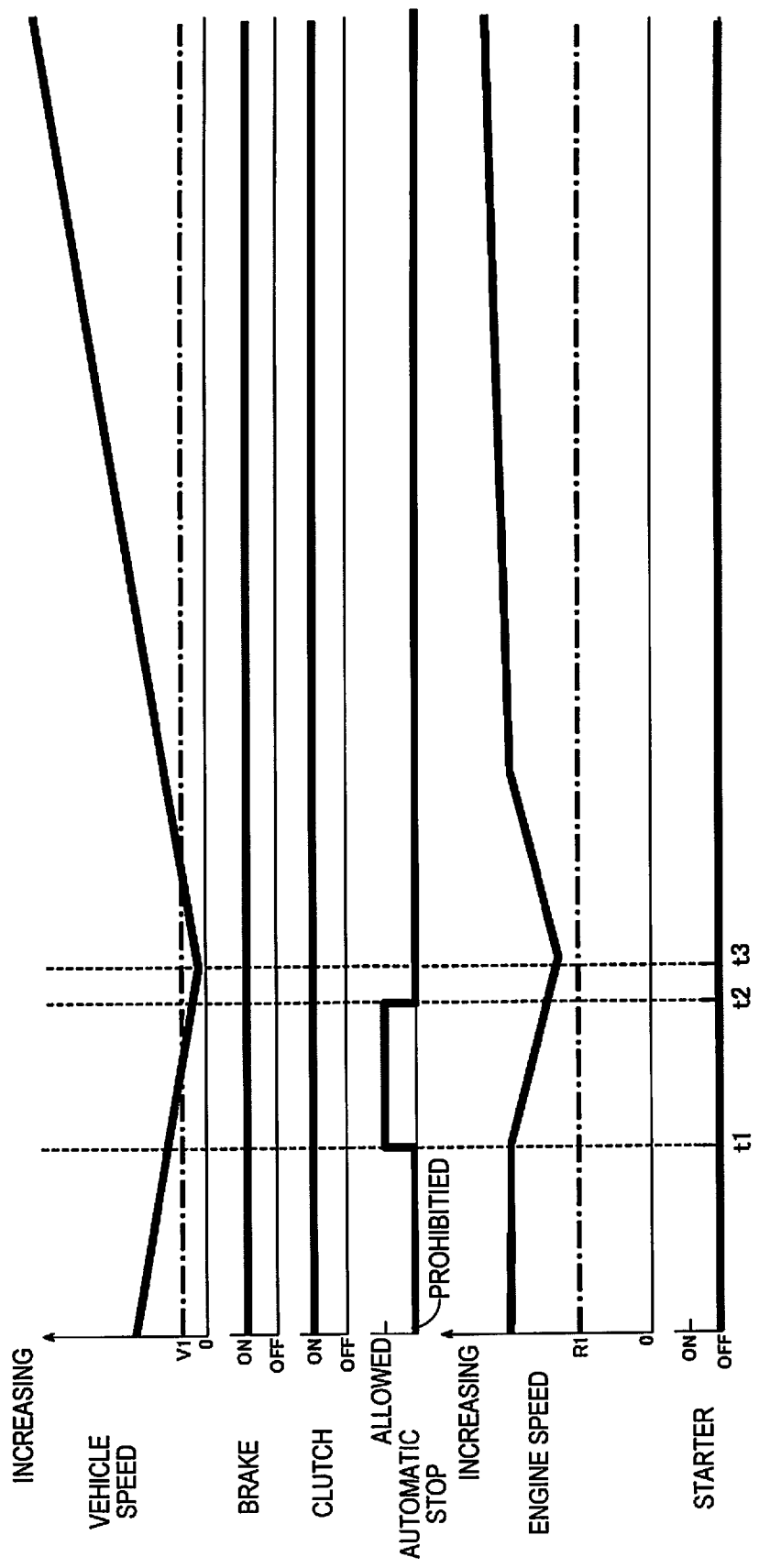
FIG. 5 is a timing chart of an example showing how the automatically stopped internal combustion engine is restarted.

FIG. 5 is a timing chart showing how the automatically stopped internal combustion engine 1 is restarted, and shows a case in which the vehicle speed is equal to or less than the low vehicle speed threshold V1 when the automatically stopped internal combustion engine 1 is restarted.

Time t1 in FIG. 5 is a timing at which the automatic stop conditions of the internal combustion engine 1 are met. In FIG. 5, the automatic stop conditions are met at time t1, at which the brake switches to ON and the vehicle speed is decreasing, and automatic stoppage of the internal combustion engine 1 is allowed.

Time t2 in FIG. 5 is a timing at which a restart request is issued to the automatically stopped internal combustion engine 1. That is, time t2 in FIG. 5 is a timing at which any automatic restart condition such as those described above is met.

In time t2 in FIG. 5, the brake ON state is in effect, but the vehicle speed is a low speed equal to or less than the low vehicle speed threshold V1 and the engine speed is greater than the combustion recoverable rotational speed threshold R1. Therefore, at time t2 in FIG. 5, a restart of the internal combustion engine 1 due to a combustion start is initiated. Time t3 in FIG. 5 is a timing of the first combustion after fuel injection is initiated.

Figure 6:
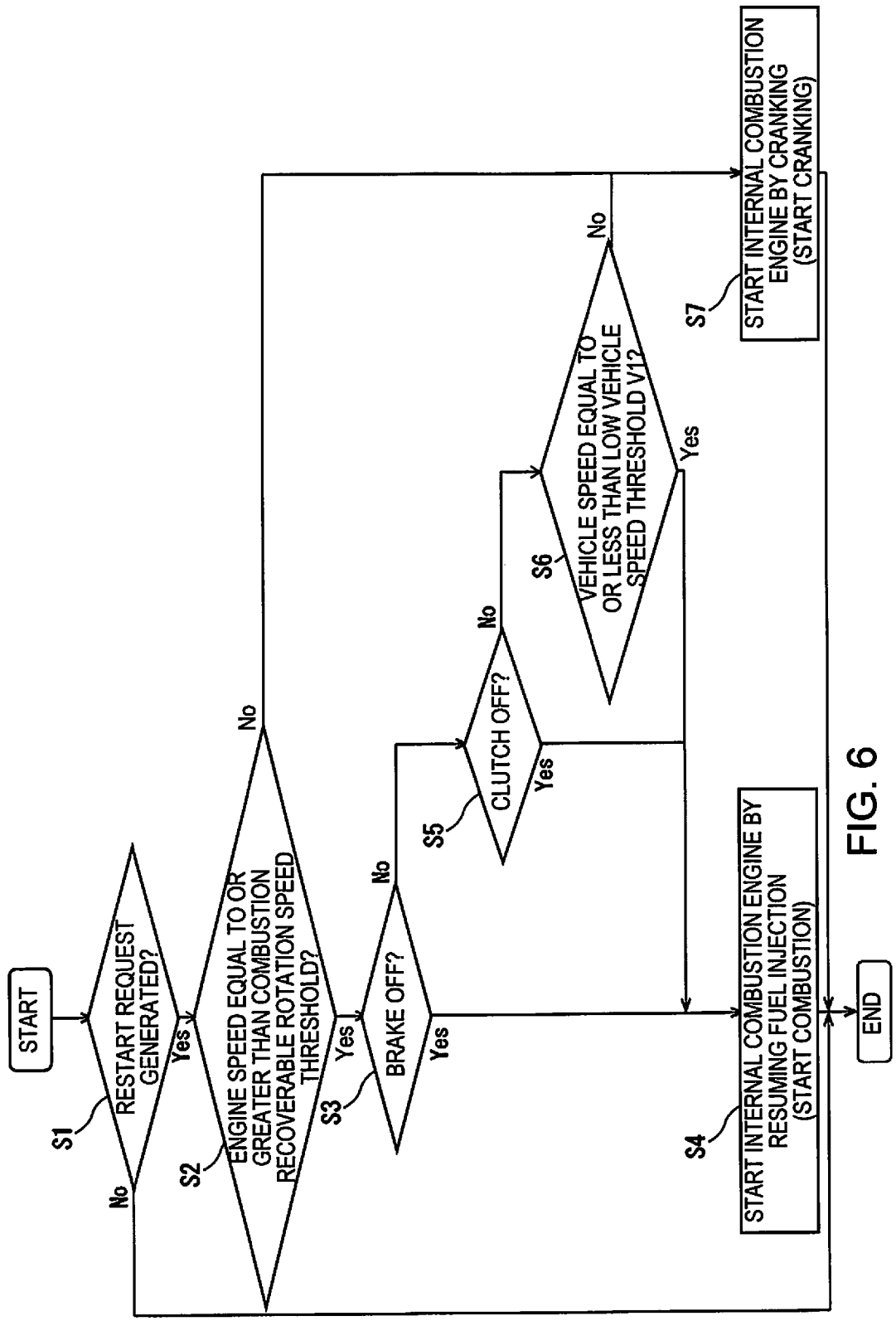
FIG. 6 is a flowchart showing a flow of a control for the internal combustion engine according to the present invention.

FIG. 6 is a flowchart showing a flow of a control for the internal combustion engine 1 in the embodiment described above.

In step S1, a determination is made as to whether or not a request to restart the internal combustion engine 1 has been generated. Specifically, a determination is made as to whether or not an automatic stop condition has been met during automatic stoppage of the internal combustion engine 1. When it is determined in step S1 that a restart request has been generated, the routine advances to step S2. When it is not determined in step S1 that a restart request has been generated, the current routine is ended.

In step S2, a determination is made as to whether or not the engine speed is equal to or greater than the combustion recoverable rotational speed threshold R1. If the engine speed is equal to or greater than the combustion recoverable rotational speed threshold R1 in step S2, the routine advances to step S3. If the engine speed is not equal to or greater than the combustion recoverable rotational speed threshold R1 in step S2, the routine advances to step S7.

In step S3, a determination is made as to whether or not a brake OFF state is in effect. If a brake OFF state is in effect in step S3, the routine advances to step S4. If a brake OFF state is not in effect in step S3, the routine advances to step S5.

In step S4, the internal combustion engine 1 is started by resuming fuel injection.

In step S5, a determination is made as to whether or not a clutch OFF state is in effect. If a clutch OFF state is in effect in step S5, the routine advances to step S4. If a clutch OFF state is not in effect in step S5, the routine advances to step S6.

In step S6, a determination is made as to whether or not the vehicle speed is equal to or less than the low vehicle speed threshold V1. If the vehicle speed is equal to or less than the low vehicle speed threshold V1 in step S6, the routine advances to step S4. If the vehicle speed is not equal to or less than the low vehicle speed threshold V1 in step S6, the routine advances to step S7.

In step S7, the internal combustion engine 1 is started by cranking via the starter motor 2.

An embodiment of the present invention was described above, but the present invention is not limited to the embodiment described above; various changes can be made inasmuch as such changes do not deviate from the main point of the invention.

For example, a rotational speed threshold is set according to the deceleration rate of the internal combustion engine, but it is also conceivable for the rotational speed threshold to not be set according to the deceleration rate of the internal combustion engine in a brake ON state. When a restart request has been made in a brake ON state while the engine speed of the internal combustion engine is decreasing due to automatic stoppage, either the rotational speed threshold need not be set or the rotational speed threshold may be set to infinity and the internal combustion engine may be caused to rotate using the electric motor and started. Furthermore, the rotational speed threshold may be set to a fixed value in a brake ON state.

The embodiment described above relates to a method and device for controlling an internal combustion engine.

The invention claimed is:

1. A control method for controlling an internal combustion engine, the control method comprising:
   stopping fuel injection to execute an automatic stoppage of the internal combustion engine when predetermined automatic stop conditions are met; and
   executing the following in response a request to restart the internal combustion engine while an engine speed of the internal combustion engine is decreasing due to the automatic stoppage:
      restarting the internal combustion engine by resuming fuel injection without cranking the internal combustion engine upon determining that a state of a brake is a brake OFF state and the engine speed is equal to or higher than a rotational speed threshold, the rotational speed threshold defining a rotational speed lower limit at which restarting is possible by resuming fuel injection without cranking,
      restarting the internal combustion engine by resuming fuel injection and cranking the internal combustion engine using an electric motor upon determining that the state of the brake is a brake ON state and the engine speed is equal to or higher than the rotational speed threshold, and
      restarting the internal combustion engine by resuming fuel injection and cranking the internal combustion engine using the electric motor regardless of the state of the brake upon determining that the engine speed is lower than the rotational speed threshold.

2. The control method according to claim 1, wherein a clutch is disposed on a motive power transmission path through which a drive force of the internal combustion engine is transmitted to a drive wheel, and when the request to restart has been made in a state in which the clutch is disengaged and the drive force of the internal combustion engine is not being transmitted to the drive wheel, the internal combustion engine is started by resuming fuel injection without cranking even in the brake ON state.

3. The control method according to claim 1, wherein when the request to restart has been made while a vehicle having the internal combustion engine as a drive source has stopped, the internal combustion engine is started by resuming fuel injection without cranking even in the brake ON state.

4. The control method according to claim 1, wherein p1 when the request to restart has been made while a vehicle speed of a vehicle having the internal combustion engine as a drive source is equal to or less than a predetermined low vehicle speed threshold, the internal combustion engine is started by resuming fuel injection without cranking even in the brake ON state.

5. The control method according to claim 1, wherein the rotational speed threshold is set according to a deceleration rate of the internal combustion engine.

6. The control method according to claim 5, wherein the rotational speed threshold is not set according to the deceleration rate of the internal combustion engine in the brake ON state.

7. The control method according to claim 5, wherein when the request to restart has been made while the brake is in the brake ON state and the engine speed of the internal combustion engine is decreasing due to the automatic stoppage, either the rotational speed threshold is not set or the rotational speed threshold is set to infinity and the internal combustion engine is restarted by resuming fuel injection and cranking the internal combustion engine using the electric motor.

8. The control method according to claim 5, wherein the rotational speed threshold is set to a fixed value in the brake ON state.

9. A device for controlling an internal combustion engine, the control device comprising:
   an electric motor configured to rotate a crankshaft to start the internal combustion engine;
   an air amount adjustment part configured to adjust an amount of air supplied into cylinders of the internal combustion engine;
   a first control part configured to stop fuel injection to execute an automatic stoppage of the internal combustion engine when predetermined automatic stop conditions are met; and
   a second control part configured to execute the following in response a request to restart the internal combustion engine while an engine speed of the internal combustion engine is decreasing due to the automatic stoppage:
      restarting the internal combustion engine by resuming fuel injection without cranking the internal combustion engine upon determining that a state of a brake is a brake OFF state and the engine speed is equal to or higher than a rotational speed threshold, the rotational speed threshold defining a rotational speed lower limit at which restarting is possible by resuming fuel injection without cranking,
      restarting the internal combustion engine by resuming fuel injection and cranking the internal combustion engine using an electric motor upon determining that the state of the brake is a brake ON state and the engine speed is equal to or higher than the rotational speed threshold, and
      restarting the internal combustion engine by resuming fuel injection and cranking the internal combustion engine using the electric motor regardless of the state of the brake upon determining that the engine speed is lower than the rotational speed threshold.

* * * * *